US009220241B2

(12) United States Patent
Sayers (10) Patent No.: US 9,220,241 B2
(45) Date of Patent: Dec. 29, 2015

(54) COLLAR STRAP ATTACHMENT MECHANISM

(71) Applicant: Radio Systems Corporation, Knoxville, TN (US)

(72) Inventor: Kevin M. Sayers, Kodak, TN (US)

( * ) Notice: Subject to any disclaimer, the term of this patent is extended or adjusted under 35 U.S.C. 154(b) by 167 days.

(21) Appl. No.: 13/870,475

(22) Filed: Apr. 25, 2013

(65) Prior Publication Data

US 2013/0305491 A1    Nov. 21, 2013

Related U.S. Application Data

(60) Provisional application No. 61/647,458, filed on May 15, 2012.

(51) Int. Cl.
*A45F 5/00* (2006.01)
*A01K 27/00* (2006.01)

(52) U.S. Cl.
CPC .............. *A01K 27/00* (2013.01); *A01K 27/005* (2013.01); *A01K 27/009* (2013.01); *Y10T 24/13* (2015.01); *Y10T 24/1374* (2015.01)

(58) Field of Classification Search
CPC .............. A44B 15/005; A44B 99/005; A44B 11/2588; F16B 21/02; F16B 7/20; Y10S 24/43
USPC ..................... 24/3.4, 328, 327, 333, 348, 112, 24/DIG. 53, DIG. 43, DIG. 38, DIG. 41, 24/590.1, DIG. 50, DIG. 39; 410/82; 439/288; 403/349, 350
See application file for complete search history.

(56) References Cited

U.S. PATENT DOCUMENTS

| | | | | |
|---|---|---|---|---|
| 2,867,025 A | * | 1/1959 | Aler | 24/590.1 |
| 4,488,339 A | * | 12/1984 | Kasai | 24/587.12 |
| 4,527,760 A | * | 7/1985 | Salacuse | 248/108 |
| 4,739,566 A | | 4/1988 | Smith | |
| 4,977,860 A | | 12/1990 | Harwell | |
| 5,056,412 A | * | 10/1991 | Gautier et al. | 91/368 |
| 5,207,178 A | | 5/1993 | McDade et al. | |
| 5,454,350 A | | 10/1995 | Betheil | |
| 5,530,998 A | * | 7/1996 | Hurst et al. | 24/590.1 |
| 6,032,339 A | * | 3/2000 | D'Addario | 24/649 |
| 6,502,284 B2 | * | 1/2003 | Juda et al. | 24/7 |

(Continued)

OTHER PUBLICATIONS

International Search Report and Written Opinion for PCT/US13/40973 mailed May 14, 2013.

*Primary Examiner* — Robert J Sandy
*Assistant Examiner* — Matthew Sullivan
(74) *Attorney, Agent, or Firm* — Steven F. Owens; Merchant & Gould (57) ABSTRACT

A collar strap attachment mechanism. One embodiment of collar strap attachment mechanism utilizes a rotatable clasping system with a locking mechanism. The collar strap attachment mechanism is compatible with collars of various widths and thickness. This collar strap attachment mechanism does not require the strap to be looped through any openings so removing the clasp of the strap is unnecessary. The collar strap attachment mechanism includes a rotatable clasp with a plurality of fingers configured to close around the collar strap. The user places the collar strap attachment mechanism on the strap and rotates the two parts until the strap is captured. Once closed around the collar strap, a lock prevents the collar strap attachment mechanism from rotating back to the open position unless unlocked.

20 Claims, 4 Drawing Sheets

(56) References Cited

U.S. PATENT DOCUMENTS

2005/0087150 A1    4/2005  Reilly
2007/0178732 A1*   8/2007  Khalifa et al. .............. 439/157
2011/0123942 A1*   5/2011  Rudman ....................... 433/10
2013/0142587 A1*   6/2013  Jardel et al. ................ 411/337

* cited by examiner

COLLAR STRAP ATTACHMENT MECHANISM

CROSS-REFERENCE TO RELATED APPLICATIONS

This application is related to U.S. Provisional Application No. 61/647,458 filed May 15, 2012.

BACKGROUND

In the pet industry, collar strap mounted devices are used regularly. Depending upon the type, the device is secured to the collar in one of several ways. One conventional technique for securing a device to a collar strap is with fasteners that pass through openings in the collar strap. For example, a device with stimulus electrodes might have threaded posts extending from the device. The threaded posts pass through openings in the collar strap and the electrode portion (or a nut or similar object) is screwed onto the threaded post and holds the collar in place. Alternatively, the positions of the posts and receptacles are reversed. For example, the threaded post may extend from the electrode and be received by a threaded receptacle in the device. The requirement that the collar have openings to accommodate the posts prevents the pet owner from using a collar strap of their choosing. Further, punching holes in the collar is not an option for many pet owners due to the lack of appropriate tools and/or skills and the potential damage to the collar strap.

Another commonly used attachment technique is passing the collar strap through openings (e.g., loops) on the device. This allows some collar straps to be used as long as the collar strap dimensions (i.e., the width and thickness) are compatible with the loop dimensions. Collar straps are often viewed as fashion accessories and there is no industry standard for the dimensions. The range of widths for collar straps available in the marketplace varies considerably from approximately 6.4 mm (0.25 in) to approximately 38.1 mm (1.5 in). The large variation in collar strap widths prevents a device from being compatible with all collar straps that a pet owner may desire for the pet. This technique also assumes the collar strap employs a clasp that allows the ends of the collar strap to be detached from each other (i.e., the collar opens) in the manner of a conventional belt buckle. Collars that are permanently closed, such as Martingale collars, are simply not compatible with devices intended to be mounted to a collar. Other collar straps have two part clasps, such a quick release buckle, and each end of the collar strap carries one part of the clasp. Such clasp parts are generally larger than the collar strap and will not pass through the loops. It is with respect to these and other considerations that the present invention has been made.

BRIEF SUMMARY

Embodiments of the present invention may provide for a collar strap attachment mechanism utilizing a rotatable clasping system with a locking mechanism. The collar strap attachment mechanism is compatible with collars of various widths and thickness. This collar strap attachment mechanism does not require the strap to be looped through any openings so removing the clasp of the strap is unnecessary. The collar strap attachment mechanism includes a rotatable clasp with a plurality of fingers configured to close around the collar strap. The user places the collar strap attachment mechanism on the strap and rotates the clasp parts until the strap is captured. Once closed around the collar strap, a lock prevents the collar strap attachment mechanism from rotating back to the open position unless unlocked.

Various embodiments of the collar strap attachment mechanism include a two part clasp (i.e., housing) having a front face, which may carry a design, information, or other indicia. The two part clasp has a front part and a rear part. At least one of the clasp parts of the clasp rotates about a pivot point relative to the other clasp part. Each of the clasp parts includes a pair of fingers shaped to fit over a collar strap. The rear part also defines a rear face. In some embodiments, the clasp parts cooperatively form a housing configured to contain other components, such as the electronics of an electronic pet training or monitoring device. In other embodiments, the two part clasp does not contain the other components, but is connected to an independent housing that contains the other components.

The front clasp part fingers are connected to the front clasp at diametrically offset locations. Similarly, the rear clasp part fingers are connected to the rear clasp at diametrically offset locations opposite from those of the front clasp part fingers. The fingers from the front clasp part and the rear clasp part positioned on the same side of the collar strap attachment mechanism define a pair of cooperating fingers. Together with the rear face, each cooperating finger defines a channel. The channels defined by the diametrically located fingers on the same clasp part open in opposite directions. Similarly, the channels defined by the cooperating fingers open in opposite directions.

Each finger has a first portion that extends from the associated clasp part in a generally transverse direction relative to one of the clasp part faces. All of the first portions extend in the same general direction. The distance the first portions extend beyond the rear face generally determines the maximum thickness of a collar strap usable with the collar strap attachment mechanism.

Each finger also has a second portion that extends from the terminal end of the first portion and lies in a plane substantially parallel to the rear face. Within the pairs of cooperating fingers, the second portion of one cooperating finger generally extends in the direction of other cooperating finger. In other words, the second portion of each finger is the portion configured to overlie the width of the strap when the collar strap attachment mechanism is closed. In various embodiments, the vertically directed extensions are configured (e.g., shaped or angled) such that the second portions of the cooperating fingers overlap or interlock.

The collar strap attachment mechanism is secured to a collar strap by capturing the collar strap in a substantially closed loop or closure. In various embodiments, the cooperating fingers typically draw together to cooperatively form a loop in conjunction with the rear face as the clasp parts are rotated into the closed position. Conversely, as the clasp parts are rotated into the open position, the cooperating fingers separate releasing the collar strap and allowing the collar strap attachment mechanism to be removed from the collar strap. When the lock is disengaged, the clasp parts of the collar strap attachment mechanism can be pivoted to open or close the cooperating fingers

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A collar strap attachment mechanism is shown and described. One embodiment of collar strap attachment mechanism utilizes a rotatable clasping system with a locking mechanism. The collar strap attachment mechanism is compatible with collars of various widths and thickness. This collar strap attachment mechanism does not require the strap to be looped through any openings so removing the clasp of the strap is unnecessary. The collar strap attachment mechanism includes a rotatable clasp with a plurality of fingers configured to close around the collar strap. The user places the collar strap attachment mechanism on the strap and rotates the two parts until the strap is captured. Once closed around the collar strap, a lock prevents the collar strap attachment mechanism from rotating back to the open position unless unlocked.

Figure 1:
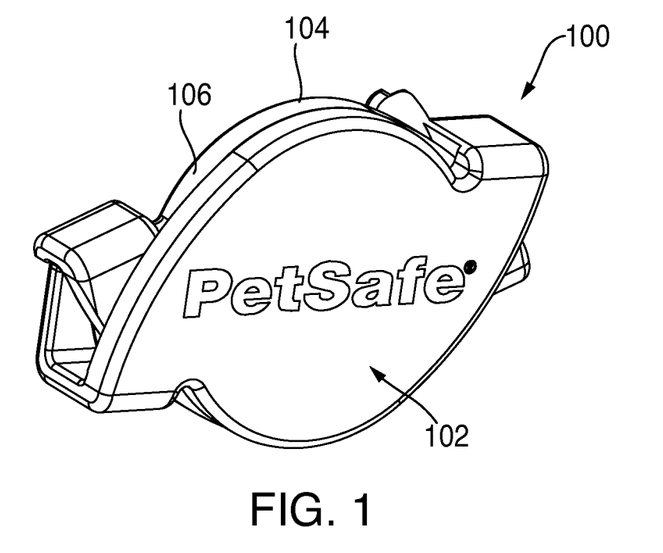
FIG. 1 is a front side perspective view of one embodiment of the collar strap attachment mechanism in a fully closed configuration.

FIG. 1 illustrates a front view of one embodiment of the collar strap attachment mechanism 100 in a fully closed configuration. The collar strap attachment mechanism 100 includes a two part clasp (i.e., housing) having a front face 102, which may carry a design, information (e.g., pet or owner identification or vaccination status), or other indicia. More specifically, the two part clasp has a front part 104 and a rear part 106. In some embodiments, the clasp parts 104, 106 cooperatively form a housing configured to contain other components, such as the electronics of an electronic pet training or monitoring device. In other embodiments, the two part clasp does not contain other components, but is connected to an independent housing that contains other components. As used herein, terms of direction (e.g., front, rear, up, down, horizontal, vertical, etc.) are used to provide a frame of reference for purposes of discussion and are not intended to limit a feature of the collar strap attachment mechanism to a single direction.

Figure 2:
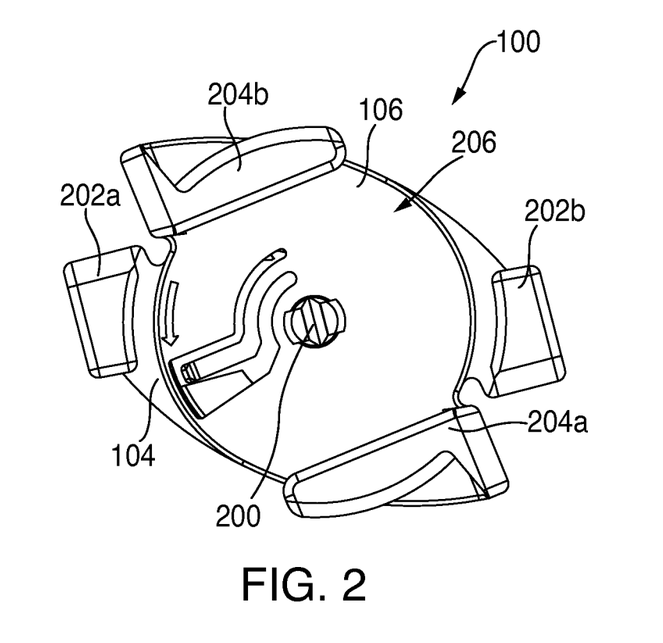
FIG. 2 is a rear elevation view of one embodiment of the collar strap attachment mechanism in an open position.

FIG. 2 is a rear elevation view of one embodiment of the collar strap attachment mechanism 100 in an open configuration. At least one of the clasp parts 104, 106 of the clasp rotates about a pivot axis 200 relative to the other clasp part. Each of the clasp parts 104, 106 includes a pair of fingers 202a, 202b, 204a, 204b shaped to fit over a collar strap. The rear clasp part 106 also defines a rear face 206. When in the open configuration, as illustrated in FIG. 2, the corresponding fingers on the clasp parts 104, 106 are separated (i.e., spread apart) allowing the rear face 206 of the rear part to be positioned against a collar strap. The fingers can be thought of as generally having a "J" or "L" shape but are not limited to such shapes. The illustrated embodiment shows the clasp parts 104, 106 as generally circular and concentric with a central pivot axis 200. In various embodiments, clasp parts 104, 106 rotate about a common pivot axis. In various embodiments, the common pivot axis is not centrally located. In various embodiments, the shape of the clasp parts 104, 106 varies and includes non-circular shapes.

Figure 3:
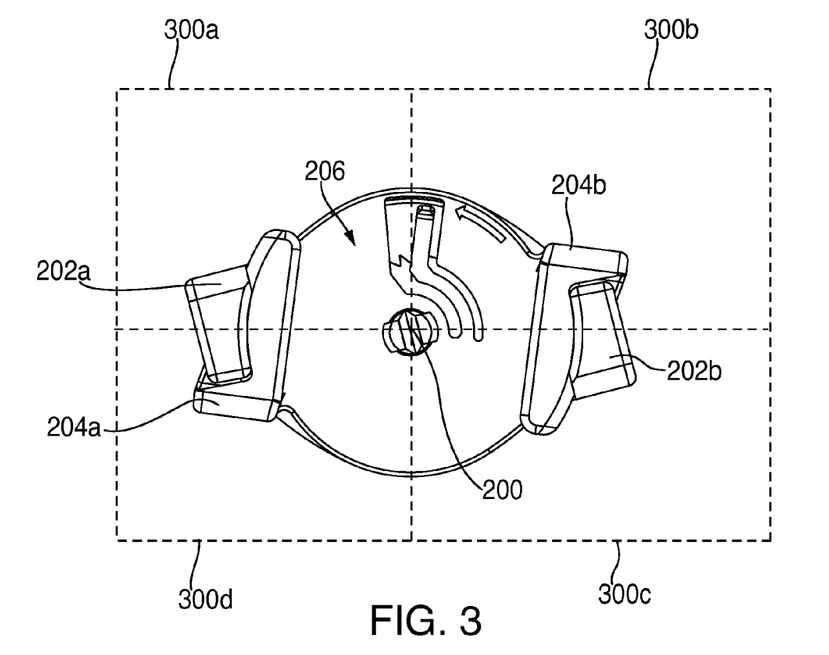
FIG. 3 is a rear elevation view of one embodiment of the collar strap attachment mechanism in a closed position.

FIG. 3 is a rear elevation view of one embodiment of the collar strap attachment mechanism 100 in a fully closed configuration. The front clasp part fingers 202a, 202b are connected to the front clasp part 104 at diametrically offset locations. Similarly, the rear clasp part fingers 204a, 204b are connected to the rear clasp part 106 at diametrically offset locations opposite from those of the front clasp part fingers 202a, 202b.

For convenience, the collar strap attachment mechanism 100 can be thought of terms of quadrants 300a-300d centered at the pivot point 200. Each of the fingers is connected to the collar strap attachment mechanism 100 in a separate quadrant. In the illustrated embodiment, the first front clasp part finger 202a is connected to the front clasp part 104 in the top left quadrant 300a, the second front clasp part finger 202a is connected to the front clasp part 104 in the bottom right quadrant 300c, the first rear clasp part finger 204a is connected to the rear clasp part 106 in the bottom left quadrant 300d, and the second rear clasp part finger 204a is connected to the rear clasp part 106 in the top right quadrant 300b.

The fingers from the front clasp part and the rear clasp part positioned on the same side of the collar strap attachment mechanism 100 define a pair of cooperating fingers. In the illustrated embodiment, the first front clasp part finger 202a and the first rear clasp part finger 204a define one pair of cooperating fingers while the second front clasp part finger 202a and the second rear clasp part finger 204b define a second pair of cooperating fingers. Together with the rear face 206, each cooperating finger defines a channel. The channels defined by the diametrically located fingers on the same clasp part open in opposite directions. Similarly, the channels defined by the cooperating fingers open in opposite directions.

Figure 4:
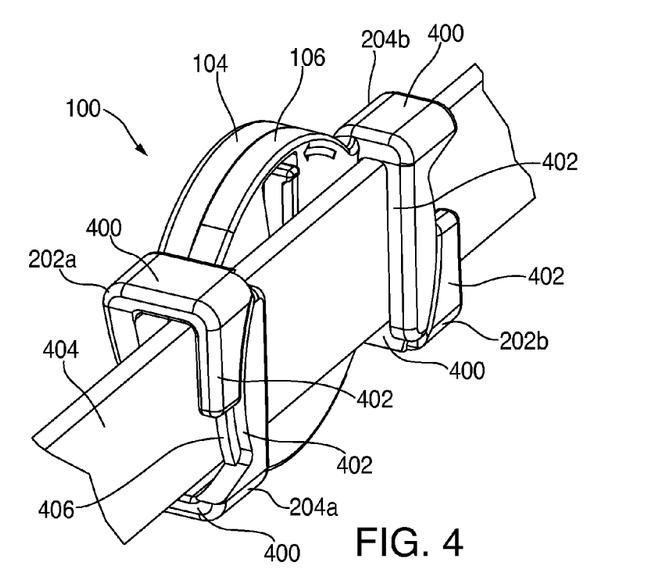
FIG. 4 is a right side perspective view of one embodiment of the collar strap attachment mechanism in a closed position and secured to a collar strap.

FIG. 4 is a right side perspective view of one embodiment of the collar strap attachment mechanism 100 in a closed position and secured to a collar strap 404. Each finger has a first portion 400 (i.e., horizontal extension) that extends from the associated clasp part 104, 106 in a generally transverse direction relative to one of the clasp part faces. All of the first portions 400 extend in the same general direction. In the illustrated embodiment, the first portions 400 extend toward the rear of the collar strap attachment mechanism 100 and extend beyond the rear face 206. The distance that the first portions 400 extend beyond the rear face 206 generally determines the maximum thickness of a collar strap 404 usable with the collar strap attachment mechanism 100. Large lengths for the first portion 400 relative to the thickness of the collar strap may result in undesirable results such as allowing the collar strap 404 to twist resulting in a loose fit and/or other complications.

Each finger also has a second portion 402 (i.e., vertical extension) that extends from the terminal end of the first portion 400 and lies in a plane substantially parallel to the rear face 206. Within the pairs of cooperating fingers, the second portion 402 of one cooperating finger generally extends in the direction of other cooperating finger. For example, in the illustrated embodiment, second portion 402 of the first front clasp part finger 202a extends from the first portion 400 toward the location of the first rear clasp part finger 204a (i.e., the bottom right quadrant 300c) and the first rear clasp part finger 204a extends from the first portion 400 toward the location of the first front clasp part finger 202a (i.e., the top right quadrant 300a). In other words, the second portion 402 of each finger is the portion configured to overlie the width of the strap when the collar strap attachment mechanism 100 is closed. In various embodiments, the vertically directed extensions are configured (e.g., shaped or angled) such that the second portions 402 of the cooperating fingers overlap or interlock. In some embodiments, the second portions 402 have curvilinear shapes. In some embodiments, the curvilinear shapes of the second portions 402 of the pair of cooperating fingers are complimentary.

The collar strap attachment mechanism 100 is secured to the collar strap 404 by capturing the collar strap in a substantially closed loop or closure. In various embodiments, the cooperating fingers typically draw together to cooperatively form a loop or closure in conjunction with the rear face 206 as the clasp parts 104, 106 are rotated into the closed position. In some embodiments, the second portions 402 of the cooperating fingers are aligned such that their ends meet to form the loop. In some embodiments, the second portions 402 of the cooperating fingers are offset such that their ends do not meet and the lengths of the second portions 402 of the cooperating fingers overlap to form the loop. In some embodiments, the ends of the second portions 402 of the cooperating fingers approach each other but remain separated by a distance less than the minimum collar strap width or the minimum collar strap thickness for which the collar strap attachment mechanism 100 is designed to form a partially open loop but one still capable of capturing the collar strap to allow the collar strap attachment mechanism 100 to be secured thereto.

In various embodiments, the fingers overlap vertically (i.e., over-and-under). In other embodiments, the cooperating fingers overlap horizontally (i.e., side-by-side). In some embodiments, the engaging edges of the cooperating fingers define complimentary joint features (e.g., rabbets) to provide greater surface contact between and distribution of loads across the cooperating fingers. Conversely, as the clasp parts 104, 106 are rotated into the open position, the cooperating fingers separate releasing the collar strap and allowing the collar strap attachment mechanism 100 to be removed from the collar strap.

The range of collar strap widths accommodated by the collar strap attachment mechanism 100 is generally contingent on the lengths of the second portions 402 of the fingers and/or the relative distance between the first portions 400 of the fingers on one of the clasp parts 104, 106. In various embodiments, the dimensions of the collar strap attachment mechanism 100 are selected to fit collar straps with widths varying from approximately 9.5 mm (0.375 in) to approximately 25.4 mm (1.0 in). In various embodiments, the collar strap attachment mechanism 100 is considered closed when rear clasp part 106 rotates relative to the front clasp part 104 to the point where the cooperating fingers meet or overlap (depending on the width of the collar strap). In other embodiments, the collar strap attachment mechanism 100 is considered closed before the cooperating fingers meet (i.e., while there is still a gap between them). In some embodiments, the lengths of first portions 400 and/or the second portions 402 vary amongst the fingers.

Figure 5:
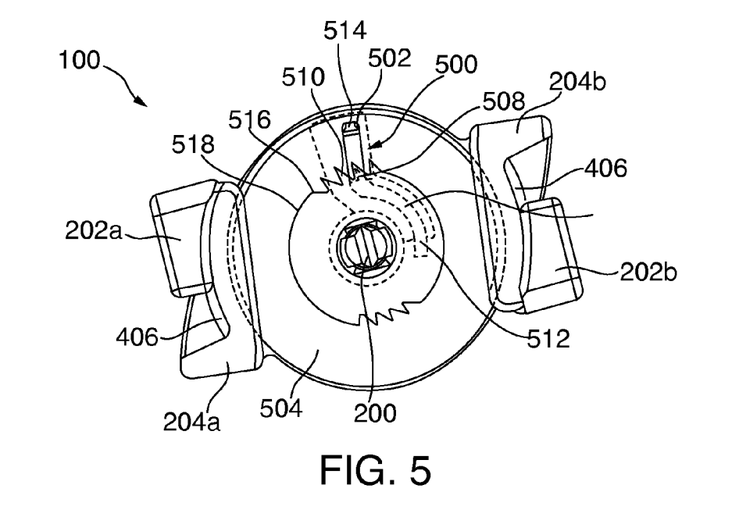
FIG. 5 is a rear elevation view of one embodiment of the collar strap attachment mechanism with the back wall made transparent to view one embodiment of the lock and lock release components.

FIG. 5 is a rear elevation view of one embodiment of the collar strap attachment mechanism 100 with the rear face 206 shown in phantom to show the components of the lock 500 and lock release 502. In various embodiments, one or more of the clasp parts 104, 106 forms a housing containing the components of the lock 500. As the clasp parts 104, 106 are rotated to close the pairs of cooperating fingers, the lock 500 engages to maintain the relative positions of the clasp parts 104, 106 so the fingers fit snugly over the collar strap. Generally, the lock 500 prevents the clasp parts 104, 106 from rotating in the direction opening the closure formed by the cooperating, or at least reduce the likelihood of such an occurrence, unless the lock 500 is released via a lock release 502. In the illustrated embodiment, the lock 500 includes an internal ratchet configured to allow the rotation of the clasp parts 104, 106 to close the cooperating fingers. The ratchet includes an engagement arm 506 carrying a pawl 508 that engages the teeth 510 of the ratchet gear 504. In various embodiments, the engagement arm 506 also serves as the lock release 502. In various embodiments, one end of the engagement arm 512 is fixedly secured to the rear clasp part 106 while the distal end 514 remains free. In the normal position, the pawl 508 is positioned to operatively engage the teeth 510. By applying force to the distal end 514, the engagement arm 506 is selectively and temporarily displaced such that the pawl 508 disengages from the gear 504 to allow one or more of the clasp parts 104, 106 to freely rotate. In other words, when the lock 500 is disengaged, the clasp parts 104, 106 of the collar strap attachment mechanism 100 can be rotated relative to one another to open or close the cooperating fingers. In some embodiments, the lock 500 and/or lock release 502 are internally located within a housing defined by one or both of the clasp parts 104, 106 (e.g., an internal ratchet). In some embodiments, the lock 500 and/or lock release 502 are between the clasp parts 104, 106. In some embodiments, the lock 500 and/or lock release 502 are external to the clasp parts 104, 106 (e.g., an external ratchet).

In various embodiments, the lock 500 is configured to have a predetermined engagement point 516. On one side of the lock engagement point the lock is engaged, and on the other side is an area of free rotation 518. When closing the lock, the clasp parts 104, 106 rotate freely without using the lock release until the lock engagement point 516 is reached. Typically, the lock engagement point 516 is set at the point where the collar strap attachment mechanism 100 is considered to be securely attached; however, it is not required that the lock engagement point and the point of secure attachment correspond. In some embodiments, the lock engagement point is set at a point before the cooperating fingers meet. Alternatively, the lock 500 is normally engaged at all times unless the lock release 502 is engaged and there is no area of free rotation without using the lock release 502.

In some embodiments, the engagement point of the lock is set at the point where the cooperating fingers meet. In still other embodiments, the lock engagement point is set at a point after the cooperating fingers overlap. Among other benefits, this area of free rotation before reaching the engagement point of the lock provides an indication to the person installing the collar strap attachment mechanism 100 that it is not yet securely attached. Until the cooperating fingers fully close around the collar strap, the collar strap could potentially work free through the gap between the cooperating fingers and the collar strap attachment mechanism 100 will be detached from the collar strap 404. While still an acceptable alternative, a lock mechanism 100 that engages before the cooperating fingers fully close around the collar strap has the potential to mislead the installer to believe the device employing the collar strap attachment mechanism 100 is securely fastened to the collar strap. In some embodiments, audible and/or tactile feedback is used to alert the person installing the collar strap attachment mechanism 100 that the lock engagement point 516 has been reached.

This area of free rotation 518 also has benefits when removing the collar strap attachment mechanism 100. In particular, the area of free rotation 518 eases the process of disengaging the collar strap attachment mechanism 100 from the collar strap by eliminating the need to continue to use the lock release to rotate the clasp parts 104, 106 once the lock engagement point is reached. This is a convenience, but not a necessity, especially considering that the lock release 502 is typically located on the rear face 206 of the rear clasp part 106 and may be difficult to reach without removing the collar strap 404 from the animal and/or be obstructed by the collar strap 404.

In some embodiments, the ratchet gear 504 includes a toothless portion and a toothed portion. The lock engagement point 516 is defined at the transition from the toothless portion to the toothed portion of the gear 504. Generally, tactile and audible feedback will be evident to the person installing the collar strap attachment mechanism 100 when the pawl 508 slips between the teeth 510 of the gear. In some embodiments, the lock 500 is a frictional lock such threaded fastener that compresses the clasp parts together when tightened. In some embodiments, the lock takes the form of a spring that normally biases the clasp parts 104, 106 towards the position where the cooperating fingers are closed. Generally, the spring lock resists or opposes (i.e., increases the force required to open), rather than preventing, opening of the cooperating fingers.

Figure 6:
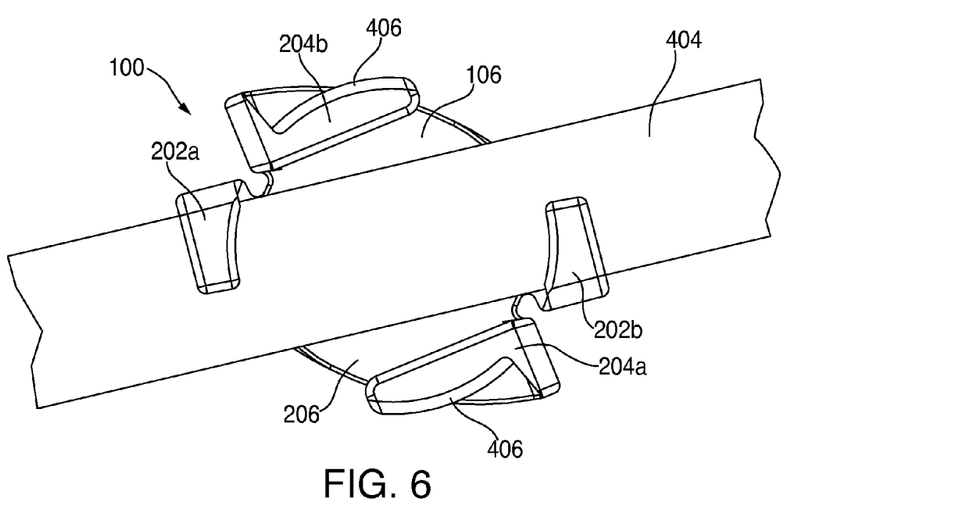
FIG. 6 is a rear elevation view of one embodiment of the collar strap attachment mechanism in an open position and partially secured to a collar strap.
Figure 7:
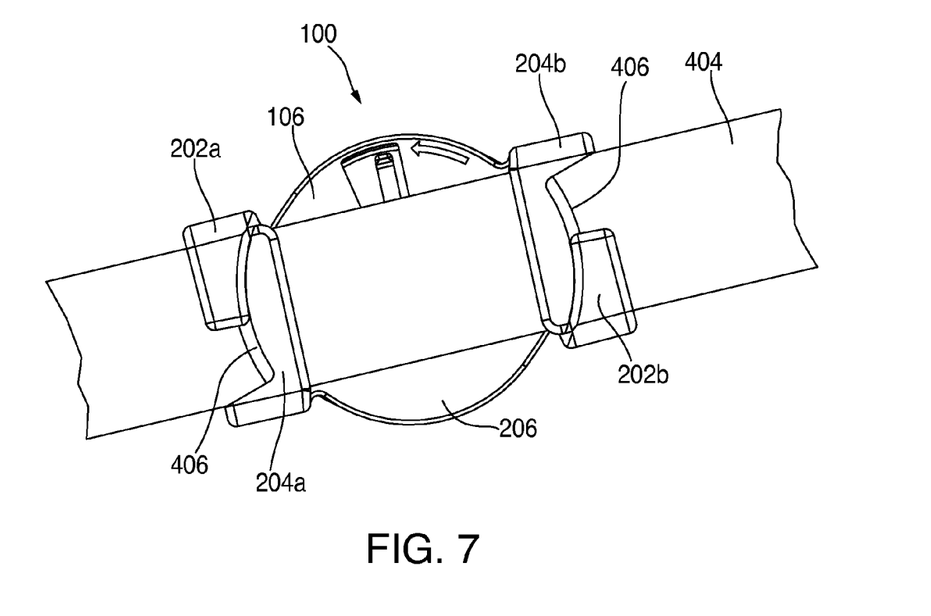
FIG. 7 is a rear elevation view of one embodiment of the collar strap attachment mechanism in a closed position and secured to a collar strap.

FIGS. 6 and 7 are rear views of one embodiment of the collar strap attachment mechanism 100 during installation on a collar strap. In use, the collar strap attachment mechanism 100 is initially opened wide enough to be placed over the collar strap 404. The collar strap attachment mechanism 100 is positioned where the diametrically positioned fingers extend around and over the collar strap, as shown in FIG. 6. As previously discussed, various embodiments of the collar strap attachment mechanism 100 will have an intended or required orientation. For example, when the front face 102 includes a logo or textual information, it is preferable to orient that information to be properly perceived by a viewer (i.e., right side up). Typically, the set of diametrically positioned fingers initially placed around the collar strap 404 are those fingers connected to and extending from the front clasp part to facilitate securing the collar strap attachment mechanism 100 in the proper or desired orientation. Once fitted over a collar strap 404, the clasp portions are rotated relative to one another in a first direction that brings the cooperating fingers together and captures the collar strap, as shown in FIG. 7. Once rotated into the closed position, the lock prevents the clasp parts 104, 106 rotating in the opposite direction.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

In one embodiment, the apparatus for attachment to a collar strap includes a housing having a front member pivotally connected to a rear member. The first member having a front face and the rear member having a rear face. The housing also defining a first side upper region, a first side lower region, a second side upper region, and a second side lower region. The apparatus further including a first finger having a first portion attached to the front member on the first side upper region. The first portion having an end positioned beyond the rear face on the first side upper region. The first finger having a second portion extending towards the first side lower region from the first portion end. The apparatus further including a second finger having a first portion attached to the front member on the second side lower region. The first portion having an end positioned beyond the rear face on the second side lower region. The second finger having a second portion extending towards the second side upper region from the second portion end. The apparatus further including a third finger having a first portion attached to the rear member on the first side lower region. The first portion having an end positioned beyond the rear face within the first side lower region. The third finger having a second portion extending towards the first side upper region from the first portion end. The third finger selectively cooperating with the first finger to capture a collar strap therebetween when the front member is rotated relative to the second member in a first direction. The third finger and the first finger separating to release the collar strap when the front member is rotated relative to the second member in a second direction. The apparatus further including a fourth finger having a first portion attached to the rear member in the second side upper region. The first portion having an end positioned beyond the rear face on the second side upper region. The second finger having a second portion extending towards the second side lower region from the second portion end. The fourth finger cooperating with the second finger to capture the collar strap therebetween when the front member is rotated relative to the second member. The fourth finger and the second finger separating to release the collar strap when the front member is rotated relative to the second member in a second direction. The apparatus further including a lock selectively operatively engaging at least one of the front member and said rear member. The lock restricting said front member and the rear member from moving relative to each other in the second direction when the lock engaged.

What is claimed is:

1. An apparatus for attachment to a collar strap, said apparatus comprising:
   a first clasp part having a first face;
   a second clasp part pivotally connected to said first clasp part;
   a first pair of fingers, one said finger attached to said first clasp part and defining a first channel between one said finger and said first clasp part, the other said finger attached to said second clasp part and defining a second channel between other said finger and said second clasp part, said first pair of fingers cooperatively capturing the collar strap within said first channel and said second channel when said second clasp part rotates relative to said first clasp part in a first direction, said first pair of fingers cooperatively separating to release the collar strap from said first channel and said second channel when said second clasp part rotates relative to said first clasp part in a second direction, said second direction being opposite first direction; and a second pair of fingers, one said finger attached to said first clasp part and defining a first channel between one said finger and said first clasp part, the other said finger attached to said second clasp part and defining a second channel between other said finger and said second clasp part, said second pair of fingers cooperatively capturing the collar strap within the first channel and second channel when said second clasp part rotates relative to said first clasp part in said first direction, said second pair of fingers cooperatively separating to release the collar strap from said first channel and said second channel when said second clasp part rotates relative to said first clasp part in said second direction, said second pair of fingers diametrically offset from said first pair of fingers.

2. The apparatus of claim 1, further comprising:
a lock opposing said second clasp part from rotating in said second direction relative to said first clasp part; and
a lock release selectively disengaging said lock to allow said second clasp part to rotate in said second direction relative to said first clasp part.

3. The apparatus of claim 2, characterized in that said lock selectively fixes the relative positions of said first clasp part and said second clasp part to maintain said closures at a selected width allowing a substantially snug fitment to a collar strap.

4. The apparatus of claim 2, characterized in that said lock is a ratchet.

5. The apparatus of claim 4, characterized in that said ratchet comprises a gear and a pawl, said gear having a portion with teeth and a portion without teeth, said lock having an engagement point determined by where said portion with teeth begins.

6. The apparatus of claim 1, characterized in that said first clasp part forms a housing.

7. The apparatus of claim 6, characterized in that said housing is adapted to contain one of an electronic animal training device and an electronic animal tracking device.

8. The apparatus of claim 1, characterized in that said first clasp part is connected to a housing.

9. The apparatus of claim 1, further comprising a spring normally biasing said second clasp part to rotate in said first direction relative to said first clasp part.

10. The apparatus of claim 1, characterized in that said lock is a frictional lock preventing said first clasp part from rotating relative to said second clasp part.

11. The apparatus of claim 1, characterized in that:
one said finger from each of said first pair of fingers and said second pair of fingers has a first portion extending from said first clasp part to a point beyond said second face and a second portion extending from a terminal end of said first portion parallel to said second face and in a first direction and toward the other said finger in said corresponding said pair of fingers; and
the other said finger from each of said first pair of fingers and said second pair of fingers has a first portion extending from said second clasp part to a point beyond said second face and a second portion extending from a terminal end of said first portion parallel to said second face and in a second direction opposite to said first direction.

12. An apparatus for attachment to a collar strap, said apparatus comprising:
a first clasp part;
a second clasp part pivotally connected to said first clasp part and having a face;

a first finger and a second finger connected to said first clasp part, said first finger diametrically offset from said second finger, said first finger and said second finger each having a first portion extending to a plane parallel to said face and offset from said face by a selected distance and a second portion, said first finger and said second finger each having a second portion extending from said first portion and lying in said plane, said first finger second portion and said second finger second portion oriented in opposite directions, the first finger defining a first channel between said first finger second portion and said first clasp part, the second finger defining a second channel between said second finger second portion and said first clasp part;

a third finger and a fourth finger connected to said second clasp part, said third finger diametrically offset from said fourth finger, said third finger and said fourth finger each having a first portion extending to said plane, said third finger and said fourth finger each having a second portion extending from said first portion and lying in said plane, said third finger second portion and said fourth finger second portion oriented in opposite directions, the third finger defining a third channel between said third finger second portion and said second clasp part, the fourth finger defining a second channel between said fourth finger second portion and said second clasp part;

said first finger and said third finger cooperatively capturing the collar strap within said first channel and said third channel and said second finger and said fourth finger cooperatively capturing the collar strap within said second channel and said fourth channel when said second clasp part is rotated in a first direction;

said first finger and said third finger cooperatively separating to release the collar strap from said first channel and said third channel and said second finger and said fourth finger cooperatively separating to release the collar strap from said second channel and said fourth channel when said second clasp part is rotated in a second direction relative to said first clasp part;

a lock opposing said second clasp part from rotating in said second direction after said first finger engages said third finger and said second finger engages said fourth finger; and a lock release selectively disengaging said lock to allow said second clasp part to rotate in said second direction relative to said first clasp part.

13. The apparatus of claim 12, characterized in that said first finger, said third finger, and said face and said second finger, said fourth finger, and said face each cooperatively form a loop adapted to capture a collar strap and secure said apparatus to the collar strap when said second clasp part is rotated in a second direction relative to said first clasp part.

14. The apparatus of claim 12, characterized in that said first clasp part forms a housing adapted to contain one of an electronic animal training device and an electronic animal tracking device.

15. The apparatus of claim 12, characterized in that said first clasp part is connected to a housing.

16. The apparatus of claim 12, characterized in that said lock comprises a ratchet preventing said second clasp part from rotating in said second direction after said first finger engages said third finger and said second finger engages said fourth finger.

17. The apparatus of claim 12, characterized in that said lock comprises spring opposing said second clasp part from rotating in said second direction after said first finger engages said third finger and said second finger engages said fourth finger.

18. The apparatus of claim 12, further comprising a spring normally biasing said second clasp part to rotate in said first direction relative to said first clasp part.

19. An apparatus for attachment to a collar strap, said apparatus comprising:
- a housing having a front member pivotally connected to a rear member, said first member having a front face, said rear member having a rear face, said housing defining a first side upper region, a first side lower region, a second side upper region, and a second side lower region;
- a first finger having a first portion attached to said front member on said first side upper region, said first portion having an end positioned beyond said rear face on said first side upper region, said first finger having a second portion extending towards said first side lower region from said first portion end;
- a second finger having a first portion attached to said front member on said second side lower region, said first portion having an end positioned beyond said rear face on said second side lower region, said second finger having a second portion extending towards said second side upper region from said second portion end;
- a third finger having a first portion attached to said rear member on said first side lower region, said first portion having an end positioned beyond said rear face within said first side lower region, said third finger having a second portion extending towards said first side upper region from said first portion end; said third finger selectively cooperating with said first finger to capture a collar strap therebetween when said front member is rotated relative to said second member in a first direction, said third finger and said first finger separating to release the collar strap when said front member is rotated relative to said second member in a second direction;
- a fourth finger having a first portion attached to said rear member in said second side upper region, said first portion having an end positioned beyond said rear face on said second side upper region, said second finger having a second portion extending towards said second side lower region from said second portion end, said fourth finger cooperating with said second finger to capture the collar strap therebetween when said front member is rotated relative to said second member, said fourth finger and said second finger separating to release the collar strap when said front member is rotated relative to said second member in a second direction; and
- a lock selectively operatively engaging at least one of said front member and said rear member, said lock restricting said front member and said rear member from moving relative to each other in said second direction when said lock engaged.

20. The apparatus of claim 19, further comprising a lock release selectively disengaging said lock from at least one of said front member and said rear member, said front member and said rear member being movable relative to each other when said lock is disengaged.

* * * * *